United States Patent
Senzaki

(10) Patent No.: US 10,940,504 B2
(45) Date of Patent: Mar. 9, 2021

(54) SURFACE TREATMENT METHOD, ANTI-STATIC AGENT, AND HYDROPHILIZING TREATMENT AGENT

(71) Applicant: Tokyo Ohka Kogyo Co., Ltd., Kanagawa (JP)

(72) Inventor: Takahiro Senzaki, Kanagawa (JP)

(73) Assignee: TOKYO OHKA KOGYO CO., LTD., Kanagawa (JP)

( * ) Notice: Subject to any disclaimer, the term of this patent is extended or adjusted under 35 U.S.C. 154(b) by 119 days.

(21) Appl. No.: 15/459,071

(22) Filed: Mar. 15, 2017

(65) Prior Publication Data

US 2017/0266694 A1  Sep. 21, 2017

(30) Foreign Application Priority Data

Mar. 17, 2016 (JP) .............................. JP2016-054505

(51) Int. Cl.

| | | |
|---|---|---|
| *B05D 5/00* | (2006.01) | |
| *C09D 133/26* | (2006.01) | |
| *C09D 141/00* | (2006.01) | |
| *B05D 7/00* | (2006.01) | |
| *B05D 7/04* | (2006.01) | |
| *B05D 1/38* | (2006.01) | |
| *B05D 1/00* | (2006.01) | |
| *B05D 1/18* | (2006.01) | |
| *B05D 1/28* | (2006.01) | |
| *B05D 3/00* | (2006.01) | |
| *C09D 5/24* | (2006.01) | |
| *B05D 3/10* | (2006.01) | |
| *C08K 3/16* | (2006.01) | |
| *C08K 3/30* | (2006.01) | |

(52) U.S. Cl.

CPC ............... *B05D 5/00* (2013.01); *B05D 1/005* (2013.01); *B05D 1/18* (2013.01); *B05D 1/283* (2013.01); *B05D 1/38* (2013.01); *B05D 3/007* (2013.01); *B05D 7/04* (2013.01); *B05D 7/54* (2013.01); *B05D 7/544* (2013.01); *C09D 5/24* (2013.01); *C09D 133/26* (2013.01); *C09D 141/00* (2013.01); *B05D 3/101* (2013.01); *B05D 2451/00* (2013.01); *C08K 3/16* (2013.01); *C08K 3/30* (2013.01); *C08K 2003/162* (2013.01); *C08K 2003/3063* (2013.01)

(58) Field of Classification Search
None
See application file for complete search history.

(56) References Cited

U.S. PATENT DOCUMENTS

| | | | |
|---|---|---|---|
| 4,543,316 A | 9/1985 | Thoese | |
| 5,510,158 A | 4/1996 | Hiramoto et al. | |
| 2001/0044492 A1* | 11/2001 | Schwark | G03G 5/14778 524/539 |
| 2014/0363689 A1* | 12/2014 | Grunlan | B60C 1/0008 428/492 |
| 2017/0148970 A1* | 5/2017 | Yu | H01B 1/24 |

FOREIGN PATENT DOCUMENTS

| | | |
|---|---|---|
| EP | 0 153 133 | 8/1985 |
| EP | 0 269 059 | 6/1988 |
| EP | 0 511 650 | 11/1992 |
| EP | 2 532 518 | 12/2012 |
| JP | 7-196303 | 8/1995 |
| JP | 8-165438 | 6/1996 |
| JP | 2001-64586 | 3/2001 |
| JP | 2003-226866 | 8/2003 |
| JP | 2006-181407 | 7/2006 |
| TW | 201139590 | 11/2011 |
| WO | 00/11052 | 3/2000 |
| WO | 2011/058171 | 5/2011 |
| WO | 2013/118736 | 8/2013 |

OTHER PUBLICATIONS

McNeil, J.D., Electrical Conducticity of Soils and Rocks, 1980, pp. 5-21. (Year: 1980).*
Clark et al. (Ionic Effects of Sodium Chloride on the Templated Deposition of Polyelectrolytes using LbL Ionic Assembly, Macromolecules, 1997, 30, 7237-7244; Clark (Year: 1997).*
Partial European Search Report dated Jul. 28, 2017 in European Application No. 17160667.6.
Notification for Reasons of Refusal dated Nov. 19, 2019 in corresponding Japanese Patent Application No. 2016-054505.
Notification of Reasons for Refusal dated Jul. 7, 2020 in corresponding Japanese Application No. 2016/054505.
Office Action dated Oct. 7, 2020 in Taiwanese Patent Application No. 106108354.

* cited by examiner

*Primary Examiner* — Francisco W Tschen
(74) *Attorney, Agent, or Firm* — Wenderoth, Lind & Ponack, L.L.P.

(57) ABSTRACT

To provide a surface treatment method for hydrophilizing a surface of a treatment target and preventing charging by a simple and easy method and an anti-static agent. The present invention provides a surface treatment method. The method comprises an anti-static treatment step of coating a treatment target with an anti-static agent comprising an electrolyte (e1), a hydrophilic polymer (a) and water, and having electrical conductivity of 15 mS/m or more to obtain a coated film (A), drying the coated film (A) to obtain an anti-static layer, and a hydrophilizing treatment step of coating the anti-static layer with a hydrophilizing treatment agent comprising a hydrophilic polymer (b) and an alcohol to obtain a coated film (B), and drying the coated film (B), followed by rinsing thereof.

19 Claims, No Drawings

SURFACE TREATMENT METHOD, ANTI-STATIC AGENT, AND HYDROPHILIZING TREATMENT AGENT

BACKGROUND OF THE INVENTION

Field of the Invention

The present invention relates to a surface treatment method, an anti-static agent and a hydrophilizing treatment agent.

Related Art

Conventionally, as a surface treatment method for hydrophilizing a surface of a treatment target, such as a base material and a substrate made of hydrophobic polymer materials including polydimethylsiloxane, various methods including a method of carrying out plasma treatment (see, for example, Patent Document 1), a method of carrying out organosilane treatment after plasma treatment (see, for example, Patent Document 2), a method for coating a photoreactive polymer (see, for example, Patent Document 3), and the like, have been proposed.

Patent Document 1: Japanese Unexamined Patent Application, Publication No. H07-196303
Patent Document 2: Japanese Unexamined Patent Application, Publication No. 2006-181407
Patent Document 3: PCT International Publication No. WO2013/118736

SUMMARY OF THE INVENTION

However, hydrophilizing treatment by plasma treatment needs a plasma generator, hydrophilizing treatment of coating a photoreactive polymer needs a photoirradiation device. Surface treatment methods to date have not been necessarily simple methods.

Furthermore, since a treatment target is often an insulating material and is easily charged, contaminants such as dust in the air may be easily attached due to charging. Therefore, it may have been difficult to maintain hydrophilicity even when hydrophilizing treatment is carried out.

An object of the present invention is to provide a surface treatment method for hydrophilizing a surface of a treatment target and preventing charging by a simple and easy method, an anti-static agent, and a hydrophilizing treatment agent.

The present inventors have found that when an anti-static layer is formed on a surface of a treatment target using a predetermined anti-static agent containing a hydrophilic polymer and the like, and then, the anti-static layer is coated with a predetermined hydrophilizing treatment agent, hydrophilizing treatment of the treatment target can be carried out and charging can be prevented, and they have reached completion of the present invention.

(1) A first aspect of the present invention relates to a surface treatment method including: an anti-static treatment step of coating a treatment target with an anti-static agent containing an electrolyte (e1), a hydrophilic polymer (a) and water, and having electrical conductivity of 15 mS/m or more to obtain a coated film (A), and drying the coated film (A) to obtain an anti-static layer; and a hydrophilizing treatment step of coating the anti-static layer with a hydrophilizing treatment agent containing a hydrophilic polymer (b) and an alcohol to obtain a coated film (B), and drying the coated film (B), followed by rinsing thereof.

(2) A second aspect of the present invention relates to an anti-static agent containing an electrolyte (e1), a hydrophilic polymer (a) and water, and having electrical conductivity of 15 mS/m or more.

A third aspect of the present invention relates to a hydrophilizing treatment agent containing a hydrophilic polymer (b) and an alcohol having 1 to 3 carbon atoms, wherein a content of the hydrophilic polymer (b) is less than 5 mass % with respect to a mass of the hydrophilizing treatment agent, and the alcohol having 1 to 3 carbon atoms is more than 50 mass % of a solvent for hydrophilizing treatment agent.

The present invention can provide a surface treatment method for hydrophilizing a surface of a treatment target and preventing charging by a simple and easy method, an anti-static agent, and a hydrophilizing treatment agent.

DETAILED DESCRIPTION OF THE INVENTION

Hereinafter, the present invention will be explained in detail by way of embodiment.

<Surface Treatment Method>

A surface treatment method of the present embodiment includes an anti-static treatment step of coating a treatment target with an anti-static agent containing an electrolyte (e1), a hydrophilic polymer (a) and water, and having electrical conductivity of 15 mS/m or more to obtain a coated film (A), and drying the coated film (A) to obtain an anti-static layer; and a hydrophilizing treatment step of coating the anti-static layer with a hydrophilizing treatment agent containing a hydrophilic polymer (b) and an alcohol to obtain a coated film (B), and drying the coated film (B), followed by rinsing thereof.

According to the surface treatment method of the present embodiment, the anti-static layer not only can prevent the treatment target from being charged but also can provide hydrophilicity. Therefore, it is possible to facilitate coating of the hydrophilizing treatment agent in the subsequent step. As a result, this method can form the coated film (B) more easily as compared with the case where a hydrophilizing treatment agent is applied directly onto the treatment target, and can highly hydrophilize the surface of the treatment target. Therefore, this method enables sufficient hydrophilization to be carried out even when a treatment target before treatment is highly hydrophobic and water-repellent. This method can provide a treatment target with excellent anti-static property and further antifouling property by the effect of the anti-static layer after the hydrophilizing treatment step. This method can form an anti-static layer with high adhesion with respect to the treatment target. Furthermore, both the anti-static layer and the coated film (B) can be made thin. As a result, these layers cannot be easily peeled off from the treatment target, so that hydrophilicity and anti-static property, and furthermore, antifouling property can be maintained for a long time. A clean surface can be maintained for a long time. This method does not need plasma treatment, photo-reaction, and the like, which have been required in conventional hydrophilizing methods, and permits hydrophilization of a treatment target by a simple and easy treatment method of polymer coating.

(Anti-Static Treatment Step)

An anti-static treatment step is a step of coating a treatment target with an anti-static agent containing an electrolyte (e1), a hydrophilic polymer (a) and water, and having electrical conductivity of 15 mS/m or more to obtain a coated film (A), and drying the coated film (A) to obtain an anti-static layer.

A coating method of the anti-static agent can employ conventionally known methods, and examples thereof include an immersion method, a spin coating method, a roller coating method, and the like. Drying may be drying with heat treatment or drying without heat treatment. Drying can be carried out usually in the temperature range of 40° C. or more, 50° C. or more, 55° C. or more, etc., and in the temperature range of 100° C. or less, 90° C. or less, 80° C. or less, 70° C. or less, 65° C. or less, etc., and may be at, for example, 40 to 100° C., 40 to 90° C., 40 to 80° C., 50 to 70° C., 55 to 65° C., about 60° C., etc. Drying can be carried out at, for example, 60 to 100° C., and preferably 70 to 90° C., for example, for one hour or less, 30 minutes or less, 20 minutes or less, and 10 minutes or less, including 30 seconds or more, one minute or more, three minutes or more, for example, 1 to 10 minutes, and about 5 minutes. Drying enables the coated anti-static agent to be adsorbed on the treatment target, and also adsorbed on the treatment target, preferably as a thin film in the monomolecular level, for example, as an ultrathin film having a film thickness of 10 nm or less. Accordingly, hydrophilicity can be maintained for a long time.

The anti-static treatment step preferably includes rinsing after drying (in the present specification, also referred to as "rinsing treatment". The same is true to the rinsing in the hydrophilizing treatment step). The rinsing treatment can suppress tendency of the upper part of the anti-static layer to be eluted into a hydrophilizing treatment agent when the anti-static layer is thereafter coated with the hydrophilizing treatment agent. When a thickness of the anti-static layer is larger, it is particularly preferable to carry out the rinsing treatment. However, even if the rinsing treatment is not carried out, when the anti-static layer is coated with the hydrophilizing treatment agent, the lower part of the anti-static layer is maintained to be adsorbed on the treatment target, and the treatment target can be provided with the hydrophilicity and the anti-static property.

The rinsing treatment can employ conventionally well-known methods. A rinsing liquid to be used in the rinsing is preferably a rinsing liquid including water such as pure water, or an electrolyte and having electrical conductivity of 15 mS/m or more. For example, the rinsing liquid may be a solvent for an anti-static agent, and specifically, an aqueous solution including water or an electrolyte and having electrical conductivity of 15 mS/m or more. When rinsing is carried out with a rinsing liquid including an electrolyte and having electrical conductivity of 15 mS/m or more, rinsing with pure water is preferably carried out thereafter. Rinsing with such a rinsing liquid facilitates removal of an anti-static agent that is not attached to a treatment target, or an anti-static agent or its component that is not adsorbed on the treatment target in the molecular level, and permits formation of a very thin anti-static layer having, for example, a film thickness of 10 nm or less. The anti-static layer is considered to be strongly adsorbed on the treatment target mainly with an intermolecular force with respect to the hydrophilic polymer (a). In this specification, the electrical conductivity is a measurement value measured at 25° C. using an A.C. double-pole electrical conductivity measuring instrument according to JIS K 0130.

The electrical conductivity of the anti-static agent is 15 mS/m or more, preferably 50 mS/m or more, more preferably 100 mS/m or more, and further preferably 500 mS/m. When the electrical conductivity is in such a range, it is possible to provide the treatment target with suitable anti-static property. The upper limit value is not particularly limited, but from the viewpoint of industrial efficiency, actual manufacture, and the like, it is preferably 2000 mS/m or less and more preferably 1500 mS/m or less.

The electrolyte (e1) in the anti-static agent is preferably at least one metal compound selected from the group consisting of alkali metal chloride, alkaline-earth metal chloride, alkali metal sulfate, and alkaline-earth metal sulfate. Specific examples include metal chloride such as KCl, NaCl, $MgCl_2$, and $CaCl_2$; and metal sulfate such as $MgSO_4$. Metal chloride is more preferable. The content of the electrolyte (e1) in the anti-static agent may be any content as long as the electrical conductivity of the anti-static agent is 15 mS/m or more. The content may be, for example, 1 mM to 1 M, preferably 10 mM to 500 mM, and more preferably 50 mM to 100 mM with respect to the mass of the anti-static agent.

A hydrophilic polymer (a) usually has a hydrophilic group providing the polymer with hydrophilicity, and preferably has a hydrophilic group not at the main chain but at the side chain of the polymer. In this specification, when the main chain of the polymer is hydrocarbon, the side chain of the polymer is a group that substitutes a hydrogen atom constituting the hydrocarbon. As the hydrophilic group, an anion or a group capable of generating an anion is preferable, and an anion that may form a salt is more preferable. As such anions, a sulfonic acid ion (sulfo-anion; $-SO_3^-$) is preferable. The hydrophilic polymer (a) may have an amide bond ($-C(=O)-NH-$), and preferably has the amide bond not at a main chain but at a side chain of the polymer.

Specifically, the hydrophilic polymer (a) preferably has at least one group selected from the group consisting of a sulfonic acid group that may form a salt, and a group derived from a monomer represented by the following formula (A5):

$$CH_2=CR^1-CO-NR^2R^3 \qquad (A5)$$

(In the formula (A5), $R^1$ represents a hydrogen atom or a methyl group; $R^2$ and $R^3$ are the same as or different from each other and an alkyl group having 1 to 4 carbon atoms substituted with at least one group selected from the group consisting of an amino group, a sulfonic acid group and a hydroxyl group, or a hydrogen atom). The sulfonic acid group that may form a salt and the group derived from the monomer represented by the formula (A5) may be one group or two or more groups, respectively. In the specification, the constituent unit derived from a monomer (including a specific compound corresponding to the monomer) is a constituent unit introduced into a polymer chain by polymerization of the monomer. For example, a constituent unit derived from a monomer including an ethylenic unsaturated bond ($C=C$) such as a vinyl group and an acryloyl group is a constituent unit saturated by subjecting the ethylenic unsaturated bond to polymerization reaction. The alkyl group having 1 to 4 carbon atoms of $R^2$ and $R^3$ may be a linear or branched alkyl group having 1 to 4 carbon atoms. Specific examples thereof include a methyl group, an ethyl group, a propyl group, an isopropyl group, an n-butyl group, an isobutyl group, and a tert-butyl group. $R^2$ and $R^3$ are the same as or different from each other, and preferably an alkyl group having 1 to 4 carbon atoms being not substituted (that is, not having a substituent), or a hydrogen atom.

Preferable specific examples of the constituent unit derived from the monomer represented by the formula (A5) include constituent units represented by the following formulae (a5-1) to (a5-6). Among constituent units of the following formulae (a5-1) to (a5-6), the constituent units represented by the following formulae (a5-1) to (a5-3) are preferable.

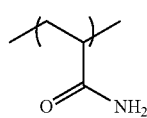

a5-1

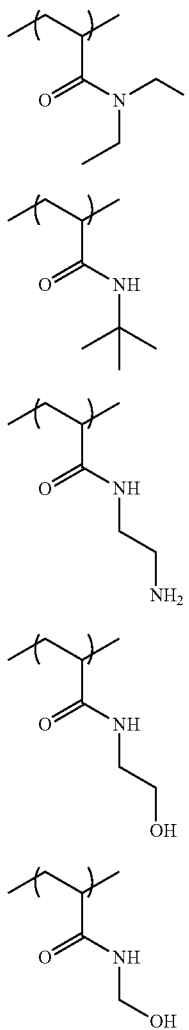

a5-2 a5-3 a5-4 a5-5 a5-6

The hydrophilic polymer (a) may be a polymer having also a hydrophobic group at the side chain of the polymer, from the viewpoint of securing adsorption property with respect to not only a hydrophilic group but also a hydrophobic treatment target. For example, the polymer may be a polymer having a hydrophobic group at the side chain in which the hydrophobic group has a hydrophilic group as a substituent. Specific examples include a polymer having a hydrophobic group at the side chain in which the hydrophobic group has a sulfonic acid group, as a substituent, which may form a salt.

The sulfonic acid group that may form a salt can be introduced into a hydrophilic polymer (a) by polymerization using a monomer having a sulfonic acid group that may form a salt. Examples of the monomer having a sulfonic acid group that may form a salt, for example, a monomer including a sulfonic acid group that may form a salt bound to a hydrophobic group include a monomer represented by the following formula (A6):

$$CH_2=CR^{S1}-R^{S2}-(SO_3^-M_{1/m})_p \qquad (A6)$$

(In the formula (A6), $R^{S1}$ represents a hydrogen atom or a methyl group, $R^{S2}$ represents a single bond, an aminoalkylene group, an amide bond-containing group, or a hydrophobic group, M represents a hydrogen atom or m-valence cation, m is an integer of 1 to 2, and p is an integer of 1 to 2. When M is a hydrogen atom, $M_{1/m}$ is equal to M). The amino alkylene group is preferably a group represented by —$NR^{S4}R^{S5}$— (in the formula, $R^{S4}$ is a linear or branched alkyl group having 1 to 4 carbon atoms, or a hydrogen atom, $R^{S5}$ is a linear or branched alkylene group having 1 to 4 carbon atoms). The amide bond-containing group is preferably a group represented by —CO—$NR^{S4}R^{S5}$— (in the formula, $R^{S4}$ is a linear or branched alkyl group having 1 to 4 carbon atoms, or a hydrogen atom, $R^{S5}$ is a linear or branched alkylene group having 1 to 4 carbon atoms). Examples of the alkyl group having 1 to 4 carbon atoms of $R^{S5}$ are the same as mentioned above in the examples of the alkyl group of $R^2$ and $R^3$. Specific examples of the linear or branched alkylene group having 1 to 4 carbon atoms of $R^{S5}$ include a methylene group, an ethylene group, a propylene group, an isopropylene group, an n-butylene group, an isobutylene group, and a tert-butylene group. Examples of the hydrophobic group include an aromatic group or an aliphatic hydrocarbon group that may have a hydrophobic substituent. An aromatic hydrocarbon group is preferable. The number of carbon atoms of these hydrocarbon groups is preferably 2 to 20, more preferably 5 to 12, and particularly preferably 6 to 10 in a case of an aromatic hydrocarbon group. As the aromatic hydrocarbon group, a phenylene group is preferable. As a cation of M, a metal ion such as an alkali metal ion and an alkaline-earth metal ion is preferable, and an alkali metal ion such as a sodium ion and a potassium ion is preferable. That is, m is more preferably 1.

Examples of the constituent unit derived from a monomer represented by the formula (A6) (that is, a constituent unit that is introduced into a polymer chain by polymerization of the monomer) include the constituent unit represented by the following formula (a6).

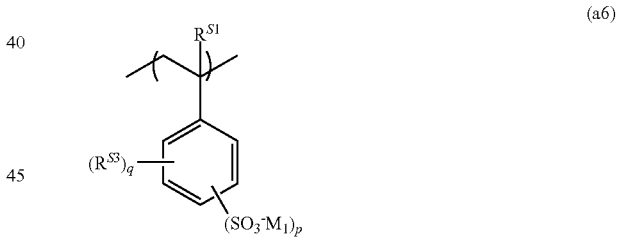

(a6)

(In the formula, $R^{S1}$, m, and p are the same as described above, $R^{S3}$ is an alkyl group having 1 to 5 carbon atoms, $M_1$ is a monovalent cation, and q is an integer of 0 to 2).

$R^{S1}$ is preferably a hydrogen atom from the viewpoint of easiness of availability. Specific examples of the alkyl group of $R^{S3}$ include a methyl group, an ethyl group, a propyl group, an isopropyl group, an n-butyl group, an isobutyl group, a tert-butyl group, a pentyl group, an isopentyl group, a neopentyl group, and other lower linear or branched alkyl group. The monovalent cation of $M_1$ is preferably an alkali metal ion, a sodium ion, a potassium ion and the like, are more preferable.

p is the most preferably 1.

q is preferably 0 or 1, and most preferably 0.

As the constituent unit represented by the formula (a6), a constituent unit derived from sodium polystyrene sulfonate represented by the following formula is preferable.

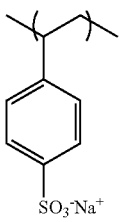

(a6-3)

Examples of the constituent unit derived from the monomer represented by the formula (A6) include constituent units represented by the following formulae (a6-1) to (a6-2).

(a6-1)

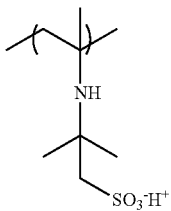

(a6-2)

The rate of the total amount of the monomer represented by the formula (A6) having a sulfonic acid group that may form a salt and/or the monomer represented by the formula (A5) in the monomers forming the hydrophilic polymer (a) is preferably 70 to 100 mol %, more preferably 80 mol % or more and less than 100 mol %, and further preferably 85 to 98 mol %, and may be 90 to 97 mol %, with respect to the total of monomers constituting the hydrophilic polymer (a). The rate of the monomer represented by the formula (A6) having a sulfonic acid group that may form a salt with respect to the total of whole monomers constituting the hydrophilic polymer (a) may be 0 mol %, and may be, for example, 5 to 100 mol % or 10 to 100 mol %. The rate of the monomer represented by the formula (A5) may be 0 mol %, and may be, for example, 5 to 100 mol % or 5 to 90 mol %. The rate in the above range (mol %) permits excellent hydrophilization of a treatment target and facilitates coating with a hydrophilizing treatment agent.

The hydrophilic polymer (a) may include groups derived from the other monomer other than the group derived from the monomer represented by the formula (A6) having a sulfonic acid group that may form a salt and/or the monomer represented by the formula (A5). The group derived from the other monomer may be one monomer or two or more monomers.

Examples of the other monomer that may form a part of the hydrophilic polymer (a), from the easiness of introduction of various functional groups, and easiness of adjustment of the amount of the functional group, include a monomer represented by the following formula (A2):

$$CH_2=CR^4-(R^5)_a-CO-R^6 \quad (A2)$$

(In the formula (A2), $R^4$ is a hydrogen atom or a methyl group, $R^5$ is a divalent hydrocarbon group, a is 0 or 1, $R^6$ is —OH or —O—$R^7$, $R^7$ is a hydrocarbon group optionally substituted with at least one functional group selected from the group consisting of a hydroxyl group, a cyano group, and a carboxyl group).

In the above-mentioned formula (A2), $R^5$ is a divalent hydrocarbon group. The number of carbon atoms of the divalent hydrocarbon group is not particularly limited, within a range in which the object of the present invention is not impaired. From the viewpoint that the hydrophilic polymer (a) is easily obtained or prepared, the number of carbon atoms of the divalent hydrocarbon group as $R^5$ is preferably 1 to 20, more preferably 1 to 12, particularly preferably 1 to 10, and most preferably 1 to 6.

The divalent hydrocarbon group as $R^5$ may be an aliphatic group, an aromatic group, and a hydrocarbon group including an aliphatic moiety and an aromatic moiety. When the divalent hydrocarbon group is an aliphatic group, the aliphatic group may be a saturated aliphatic group or an unsaturated aliphatic group. Furthermore, a structure of the aliphatic group may be a linear, branched, or cyclic group, or combination of these groups.

Specific examples of $R^5$ include a methylene group, an ethane-1,2-diyl group, an ethane-1,1-diyl group, a propane-1,3-diyl group, a propane-1,1-diyl group, a propane-2,2-diyl group, an n-butane-1,4-diyl group, an n-pentane-1,5-diyl group, an n-hexane-1,6-diyl group, an n-heptane-1,7-diyl group, an n-octane-1,8-diyl group, an n-nonane-1,9-diyl group, an n-decane-1,10-diyl group, an o-phenylene group, an m-phenylene group, a p-phenylene group, a naphthalene-2,6-diyl group, a naphthalene-2,7-diyl group, a naphthalene-1,4-diyl group, a biphenyl-4,4'-diyl group, and the like.

$R^6$ is —OH or —O—$R^7$; and $R^7$ is a hydrocarbon group optionally substituted with at least one functional group selected from the group consisting of a hydroxyl group, a cyano group, and a carboxyl group. $R^7$ may be at least one selected from the group consisting of a hydrocarbon group that does not have a substituent and a hydrocarbon group that is substituted with the functional group. Examples thereof include a hydrocarbon group that does not have a substituent, a hydrocarbon group substituted with a hydroxyl group, and the like. The hydrocarbon group constituting a main skeleton of the group of $R^6$ may be a linear, branched, or cyclic aliphatic group, or an aromatic hydrocarbon group. The number of carbon atoms of the linear, branched, or cyclic aliphatic group is preferably 1 to 20, and more preferably 1 to 12. Preferable examples of the linear or branched aliphatic group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a sec-pentyl group, a tert-pentyl group, an n-hexyl group, an n-heptyl group, an n-octyl group, an n-nonyl group, an n-decyl group, and the like. Preferable examples of the cyclic aliphatic group include cycloalkyl groups such as a cyclopropyl group, a cyclobutyl group, a cyclopentyl group, a cyclohexyl group, a cycloheptyl group, and a cyclooctyl group; a group in which one hydrogen atom is removed from polycycloalkane such as adamantane, norbornane, isobornane, tricyclodecane, and tetracyclododecane, or a group in which one hydrogen atom is removed from C1-C4 alkyl substitute of these polycycloalkanes. Preferable examples of the aromatic hydrocarbon group include a phenyl group, a naphthyl group, an anthranil group, a phenanthrenyl group, and a biphenylyl group, and the like. The aromatic hydrocarbon group may be substituted with a C1-C4 alkyl group such as a methyl group and an ethyl group.

Particularly preferable specific examples of the constituent unit derived from a monomer represented by formula (A2) include constituent units of the following formulae (a2-1) to (a2-11). Among the constituent units of the following formulae (a2-1) to (a2-11), the constituent units of (a2-1) to (a2-4) are more preferable.

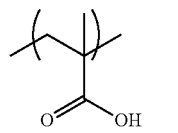

a2-1

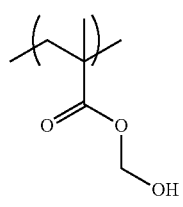

a2-2

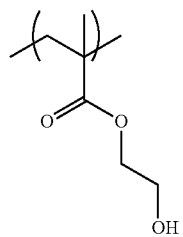

a2-3

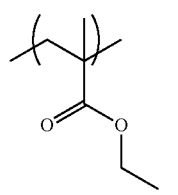

a2-4

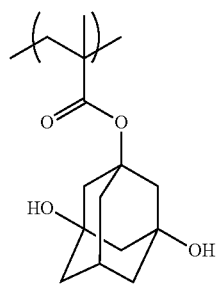

a2-5

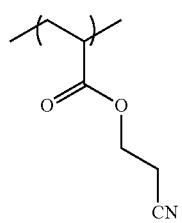

a2-6

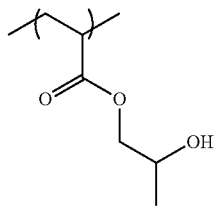

a2-7

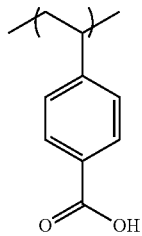

a2-8

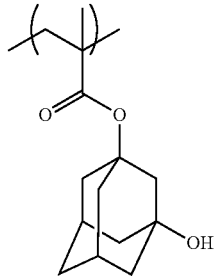

a2-9

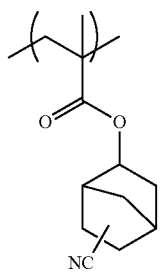

a2-10

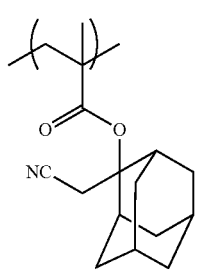

a2-11

In the monomers forming the hydrophilic polymer (a), the rate of the monomer represented by the formula (A2) is preferably 30 mol % or less, more preferably 20 mol % or less, further preferably 15 mol % or less, and still further preferably 10 mol % or less, with respect to the total amount of whole monomers constituting the hydrophilic polymer (a).

The content of the hydrophilic polymer (a) is preferably 5 mass % or less, more preferably 3 mass % or less, further preferably 2.5 mass % or less, and particularly preferably 2 mass % or less with respect to the mass of the anti-static agent. The lower limit value is preferably 0.1 mass %, more preferably 0.15 mass %, and further preferably 1 mass %. The content within such a range facilitates obtaining a thin anti-static layer by coating, drying, and rinsing in the anti-static treatment step, and enables a thin film having preferably a monomolecular level, for example, an ultrathin film having a film thickness of 10 nm or less to be formed. Thus, adsorption property between the treatment target and the anti-static layer can be secured.

A solvent for the anti-static agent is not particularly limited as long as it contains water, but is preferably water without containing an organic solvent. As the water, pure water, deionized water, and the like, are preferable.

(Hydrophilizing Treatment Step)

A hydrophilizing treatment step is a step of coating an anti-static layer with a hydrophilizing treatment agent containing a hydrophilic polymer (b) and an alcohol to obtain a coated film (B), and drying the resultant coated film (B), followed by rinsing thereof.

The method for coating with a hydrophilizing treatment agent can employ conventionally known methods as in the coating with an anti-static agent. Examples of the method include an immersion method, a spin coating method, a roller coating method, and the like. The drying may be drying with heat treatment, or drying without heat treatment. The drying can be carried out, for example, as in the drying in the anti-static treatment step. With the drying, a hydrophilic layer can be formed.

The rinsing treatment can employ conventionally well-known methods. A rinsing liquid is preferably a rinsing liquid including water or an electrolyte and having electrical conductivity of 15 mS/m or more. For example, the rinsing liquid may be a solvent for a hydrophilizing treatment agent, and specifically, an aqueous solution including water or an electrolyte and having electrical conductivity of 15 mS/m or more. When rinsing is carried out with a rinsing liquid including an electrolyte and having electrical conductivity of 15 mS/m or more, rinsing with pure water is preferably carried out thereafter. Rinsing with such a rinsing liquid facilitates removal of a hydrophilizing treatment agent that is not attached to an anti-static layer, or a hydrophilizing treatment agent or its component that is not adsorbed on the anti-static layer in the molecular level, and permits formation of a very thin layer having, for example, a film thickness of 10 nm or less (in this specification, the layer formed of the coated film (B) may be also referred to as a "hydrophilic layer"). The hydrophilic layer is considered to be strongly adsorbed on the anti-static layer mainly with an intermolecular force between the hydrophilic polymer (a) and the hydrophilic polymer (b). In this way, with the surface treatment method of the present embodiment, even when a contact angle of a surface of the treatment target coated with the anti-static agent with respect to water is, for example, 60° or more, the hydrophilic layer can be preferably formed on the treatment target via the anti-static agent layer.

The hydrophilic polymer (b) is not particularly limited as long as it is a polymer having hydrophilicity, which is soluble in water, and may be the same as or different from the hydrophilic polymer (a). The hydrophilic polymer (b) is preferably the same as the hydrophilic polymer (a). Even when the hydrophilic polymer (b) is different from the hydrophilic polymer (a) in terms of types and/or the content of the constituent unit, the hydrophilic polymer (b) preferably uses at least one selected from the above-mentioned hydrophilic polymers (a).

It is preferable that the hydrophilic polymer (b) is soluble in a solvent such as ethanol having a surface tension (surface tension: 22 dyne/cm) smaller than the surface tension of water (72 dyne/cm) from the viewpoint of improving the wettability with respect to an anti-static layer. It is desirable that the hydrophilic polymer (b) is soluble in ethanol (also referred to as "ethanol-soluble" in this specification) when the treatment target is highly hydrophobic, for example, water-repellent. It is more desirable when a material constituting a surface to be treated of the treatment target has, for example, a surface tension larger than that of ethanol, and specifically when the material has a surface tension of 50 dyne/cm or less for the below-mentioned hydrophobic material and the like, for example, a surface tension of 40 dyne/cm or less for PVC. When an ethanol-soluble hydrophilic polymer (b) is used, the surface treatment method according to the present embodiment is suitable, even when, for example, the surface tension of materials constituting the surface to be treated of the treatment target is 35 dyne/cm or less for PE etc., 25 dyne/cm or less for PVdF etc., and 20 dyne/cm or less for PTFE etc. In this specification, the ethanol solubility refers to case where when a 5 mass % ethanol solution of hydrophilic polymer was prepared, and then the resultant solution was allowed to stand still for 5 minutes, the solution becomes a homogeneous liquid by visual observation.

The content of the hydrophilic polymer (b) is preferably 5 mass % or less, more preferably less than 5 mass %, further preferably 0.5 to 3 mass %, and still further preferably 1 to 2 mass % with respect to the mass of the hydrophilizing treatment agent. When the content of the hydrophilic polymer (b) is in the above range, a thin hydrophilic layer is easily obtained by the coating, drying, and rinsing in the hydrophilizing treatment step. The intermolecular force mainly between the hydrophilic polymer (a) and the hydrophilic polymer (b) easily works, and excellent adsorption property with respect to the anti-static layer can be achieved. As a result, the treatment target can be easily hydrophilized and the hydrophilicity can be maintained for a long time.

The hydrophilizing treatment agent contains alcohol. Examples of the alcohol include aliphatic alcohol. Alcohol having 1 to 3 carbon atoms is preferable. Specific examples thereof include methanol, ethanol, n-propyl alcohol, and isopropyl alcohol. Methanol, ethanol, and isopropyl alcohol are preferable. The alcohol may be used singly or in a combination of two or more thereof. Specific examples of the solvent for the hydrophilizing treatment agent preferably include a mixed solvent of water and at least one alcohol selected from the group consisting of methanol, ethanol, and isopropyl alcohol, a mixed solvent of water and methanol, a mixed solvent of water and ethanol, a mixed solvent of water, methanol and ethanol. In addition to these preferable mixed solvents, a mixed solvent also containing isopropyl alcohol may be used. The alcohol is preferably more than 50 mass % of a solvent for the hydrophilizing treatment agent. Specifically, the rate of the total of the alcohol with respect to the mixed solvent containing water is preferably 60 mass % or more and less than 100 mass %, further preferably 80 to 98 mass %, and particularly preferably 85 to 95 mass % on the basis of the mass. As the water, pure water, deionized water, and the like, are preferable. When the hydrophilizing treatment agent contains alcohol, the hydrophilizing treatment agent can be applied to the anti-static layer.

Shapes of a treatment target are not particularly limited. The treatment target may be a flat substrate, and may have a three-dimensional shape such as a spherical shape and a columnar shape. Furthermore, the surface of the treatment target may be flat, or may have regular or irregular concavity and convexity.

A material of a surface of the treatment target, which is subjected to surface treatment by the surface treatment method according to the present embodiment (in this specification, also referred to as "surface to be treated"), is not particularly limited. However, since the surface treatment method can provide hydrophilicity, a hydrophobic material is preferable. Furthermore, since the surface treatment method can provide anti-static property, an insulating material that is easily charged with static electricity is preferable. Various materials having hydrophobic property and insulating property are preferable. Specifically, the surface to be treated of the treatment target, in particular, the surface coated with an anti-static agent may have a contact angle with respect to water of 60° or more. Even when the contact angle is 70° or more as in polystyrene, polyethylene terephthalate, or the like, the contact angle is 80° or more as in cycloolefin polymer or the like, and further the contact angle is 100° or more as in polydimethylsiloxane or the like, the surface treatment method according to the present embodiment can be preferably used.

Examples of materials for such a surface to be treated of the treatment target include a silicone polymer such as polydimethylsiloxane (PDMS) (including silicone rubber and silicone resin); halogenated ethylene polymer such as polyvinyl chloride (PVC), polyvinylidene fluoride (PVdF), and polytetrafluoroethylene (PTFE) (including rubber such as fluororubber and resin such as fluorocarbon resin); polyolefin such as polyethylene (PE) and polypropylene(PP); cyclic polyolefin such as various cycloolefin polymers (COP); polystyrene (PS); and other materials having high hydrophobicity, and polyester resin such as polyethylene terephthalate (PET) and polybutylene terephthalate (PBT); polyamide resin such as various nylon; polyimide resin; polyamide-imide resin; various resin such as (meth)acrylic resin, and other various rubbers.

Examples of such a treatment target include a cell culture instrument that requires an antifouling property, an antifog property, or the like, a micro channel device for allowing a liquid including biological samples such as cells to flow, and a substrate and a cured film, and the like, to be used for manufacturing a semiconductor.

<Anti-Static Agent>

The above-mentioned anti-static agent containing an electrolyte (e1), a hydrophilic polymer (a) and water, and having electrical conductivity of 15 mS/m or more is also encompassed by the present invention.

As mentioned above, the anti-static agent according to the present embodiment can prevent charging of a treatment target which has a hydrophobic or water-repellent surface to be treated and, in particular, a surface to be treated made of an insulating material that is easily charged. Furthermore, as mentioned above, when an anti-static layer is formed on a treatment target using the anti-static agent according to the present embodiment, it is possible to prevent the treatment target from being charged. It is also possible to facilitate formation of a hydrophilic layer on the anti-static layer, thus hydrophilizing the surface of the treatment target. Since the anti-static layer has excellent adhesion with respect to the treatment target or the treatment target and the hydrophilic layer, the hydrophilicity and the anti-static property can be maintained for a long time. An anti-static method including coating a treatment target with the above-mentioned anti-static agent containing an electrolyte (e1), a hydrophilic polymer (a) and water, and having electrical conductivity of 15 mS/m or more to obtain a coated film (A), and drying the coated film (A), is also encompassed by the present invention. The anti-static method preferably includes rinsing after the drying. The rinsing is the same as the above-mentioned rinsing treatment.

<Hydrophilizing Treatment Agent>

The above-mentioned hydrophilizing treatment agent containing a hydrophilic polymer (b) and alcohol having 1 to 3 carbon atoms, wherein a content of the hydrophilic polymer (b) is less than 5 mass % with respect to a mass of the hydrophilizing treatment agent, and the alcohol having 1 to 3 carbon atoms is more than 50 mass % of a solvent for hydrophilizing treatment agent is also encompassed by the present invention.

As mentioned above, the hydrophilizing treatment agent according to the present embodiment can provide hydrophilicity to a treatment target having a hydrophobic or water-repellent surface to be treated. Furthermore, as mentioned above, when a hydrophilic layer is formed on a treatment target using the hydrophilizing treatment agent according to the present embodiment, it is possible to facilitate formation of a hydrophilic layer on the treatment target, in particular, the anti-static layer, thus hydrophilizing the surface of the treatment target. Since the hydrophilic layer has excellent adhesion with respect to the treatment target or the anti-static layer, the hydrophilicity can be maintained for a long time. A hydrophilizing method including coating a treatment target with the above-mentioned hydrophilizing treatment agent containing a hydrophilic polymer (b) and alcohol having 1 to 3 hydrocarbons, wherein a content of the hydrophilic polymer (b) is less than 5 mass % with respect to a mass of the hydrophilizing treatment agent, and the alcohol having 1 to 3 hydrocarbons is more than 50 mass % of a solvent for hydrophilizing treatment agent to obtain a coated film (B), and drying the coated film (B), followed by rinsing thereof, is also encompassed by the present invention. The treatment target preferably includes the above-mentioned anti-static layer.

EXAMPLES (Hydrophilic Polymer)

As shown in Table 1, hydrophilic polymers (P-1) to (P-9) including the constituent units represented by the above-mentioned formulae (a5-1) to (a5-3), formulae (a6-1) to (a6-3), and formulae (a2-1) to (a2-4) were prepared. The unit of numerical values in Table 1 is mass %. Table 1 also shows ethanol solubility of each polymer.

TABLE 1

|  |  | P-1 | P-2 | P-3 | P4 | P-5 | P-6 | P-7 | P-8 | P-9 |
|---|---|---|---|---|---|---|---|---|---|---|
| Constituent unit of hydrophilic polymer | a5-1 | 35 |  |  |  | 10 | 5 | 50 |  | 80 |
|  | a5-2 |  | 90 |  |  |  |  |  |  |  |
|  | a5-3 |  |  |  |  |  |  |  |  | 10 |
|  | a6-1 |  |  | 100 |  |  |  |  |  |  |
|  | a6-2 | 60 |  |  | 100 | 80 | 90 | 45 |  | 10 |
|  | a6-3 |  |  |  |  |  |  |  | 85 |  |
|  | a2-1 | 5 |  |  |  |  |  |  |  |  |
|  | a2-2 |  | 10 |  |  |  |  | 5 | 10 |  |

TABLE 1-continued

|  | P-1 | P-2 | P-3 | P4 | P-5 | P-6 | P-7 | P-8 | P-9 |
|---|---|---|---|---|---|---|---|---|---|
| a2-3 |  |  |  |  | 10 |  |  |  |  |
| a2-4 |  |  |  |  |  | 5 |  | 5 |  |
| Ethanol solubility | Soluble | Soluble | Insoluble | Soluble | Soluble | Soluble | Soluble | Insoluble | Insoluble |

Examples 1 to 24 and Comparative Examples 1 to 10

(Anti-Static Treatment Step)

As shown in Table 2, anti-static agents (compositions: Q-1 to Q-17) containing a hydrophilic polymer, a solvent, and an electrolyte were prepared. All of the polymer concentrations [mass %] and the electrolyte concentrations [mM] in Table 2 are concentrations in the anti-static agent. In each of the resulting anti-static agents, the electrical conductivity was measured by the method as mentioned above. The measurement values are shown in Table 2. As shown in Table 4, a substrate as a treatment target including polydimethylsiloxane, a cycloolefin polymer ("ZEONEX" (registered trademark) manufactured by Nippon Zeon Co., Ltd.), polystyrene, or polyethylene terephthalate was immersed in each anti-static agent for one minute to form coated films (A), respectively. These were dried in an oven at 60° C. for 5 minutes. Thereafter, these were rinsed with pure water shower for one minute to form anti-static layers (film thickness: 5 nm), respectively.

TABLE 2

| Anti-static agent | Hydrophilic polymer (a) | Polymer concentration [mass %] | Solvent | Electrolyte | Electrolyte concentration [mM] | Electrical conductivity [mS/m] |
|---|---|---|---|---|---|---|
| Composition Q-1 | P-1 | 1 | Pure water | KCl | 50 | 620 |
| Composition Q-2 | P-2 | 1 | Pure water | KCl | 100 | 1200 |
| Composition Q-3 | P-3 | 1 | Pure water | KCl | 100 | 1200 |
| Composition Q-4 | P-4 | 1 | Pure water | KCl | 100 | 1200 |
| Composition Q-5 | P-5 | 1 | Pure water | KCl | 100 | 1200 |
| Composition Q-6 | P-6 | 1 | Pure water | KCl | 100 | 1200 |
| Composition Q-7 | P-7 | 1 | Pure water | KCl | 100 | 1200 |
| Composition Q-8 | P-8 | 1 | Pure water | KCl | 100 | 1200 |
| Composition Q-9 | P-9 | 1 | Pure water | KCl | 100 | 1200 |
| Composition Q-10 | P-1 | 2 | Pure water | NaCl | 50 | 550 |
| Composition Q-11 | P-8 | 2 | Pure water | $MgSO_4$ | 50 | 850 |
| Composition Q-12 | P-8 | 1 | Pure water | NaCl/KCl | 25/25 | 600 |
| Composition Q-13 | P-9 | 2 | Pure water | $CaCl_2$ | 50 | 800 |
| Composition Q-14 | P-1 | 1 | Pure water | — | — | 0.5 |
| Composition Q-15 | P-8 | 1 | Pure water | — | — | 0.5 |
| Composition Q-16 | — | — | Pure water | KCl | 50 | 620 |
| Composition Q-17 | P-1 | 1 | Pure water | KCl | 0.1 | 1.2 |

TABLE 3

| Hydrophilizing treatment agent | Hydrophilic polymer (b) | Polymer concentration [mass %] | Solvent |
|---|---|---|---|
| Composition W-1 | P-1 | 1 | Pure water/EtOH = 10/90 |
| Composition W-2 | P-2 | 1 | Pure water/EtOH = 10/90 |
| Composition W-3 | P-4 | 1 | Pure water/EtOH = 10/90 |
| Composition W-4 | P-5 | 1 | Pure water/EtOH = 10/90 |
| Composition W-5 | P-6 | 1 | Pure water/EtOH = 10/90 |
| Composition W-6 | P-7 | 1 | Pure water/EtOH = 10/90 |
| Composition W-7 | P-5 | 2 | Pure water/MeOH = 10/90 |
| Composition W-8 | P-5 | 1 | Pure water/IPA/MeOH = 10/50/40 |
| Composition W-9 | P-5 | 1 | Pure water/IPA/EtOH = 10/50/40 |
| Composition W-10 | P-1 | 1 | Pure water |
| Composition W-11 | P-2 | 1 | Pure water |
| Composition W-12 | P-5 | 1 | Pure water |

(Hydrophilizing Treatment Step)

As shown in Table 3, hydrophilizing treatment agents (compositions: W-1 to W-12) containing a hydrophilic polymer and a solvent were prepared. In Table 3, MeOH represents methanol, EtOH represents ethanol, and IPA represents isopropanol, respectively. In Table 3, the polymer concentration [mass %] is a concentration in the hydrophilizing treatment agent, and the blending ratio of each type of solvent is a mass ratio. Then, as shown in Table 4, substrates or substrates that had been subjected to the anti-static treatment step were immersed in hydrophilizing treatment agents for one minute to form coated films (B), respectively. These were dried in an oven at 60° C. for 5 minutes. Thereafter, these were rinsed with pure water shower for one minute to form hydrophilic layers on the anti-static layers, respectively.

(Evaluation of Surface Treatment Effect)

Pure water droplet (2.0 μL) was dropped onto substrates which had not been subjected to surface treatment and substrates which had been subjected to surface treatment, one minute after the dropping, a contact angle was measured using Contact Angle Meter ("Dropmaster" manufactured by Kyowa Interface Science Co., Ltd). Results are shown in Table 4. In Example 1, Example 22, and Comparative Examples 1 to 3, 7 and 8, the contact angles one week after dropping were also measured. As a result, in Examples 1 and 22, the contact angle immediately after the treatment was maintained, but in Comparative Examples 1 to 3, 7 and 8, the contact angle was increased to 70° or more. In Table 4, PDMS represents polydimethylsiloxane, COP represents a cycloolefin polymer, PS represents polystyrene, and PET represents polyethylene terephthalate.

TABLE 4

|  |  | Hydrophilizing treatment agent | Anti-static agent | Substrate | Contact angle before treatment [°] | Contact angle after treatment [°] |
|---|---|---|---|---|---|---|
| Example | 1 | Composition W-1 | Composition Q-1 | PDMS | 113.0 | 6.5 |
|  | 2 | Composition W-2 | Composition Q-1 | PDMS | 113.0 | 8.1 |
|  | 3 | Composition W-3 | Composition Q-1 | PDMS | 113.0 | 7.5 |
|  | 4 | Composition W-4 | Composition Q-1 | PDMS | 113.0 | 6.9 |
|  | 5 | Composition W-5 | Composition Q-1 | PDMS | 113.0 | 7.2 |
|  | 6 | Composition W-6 | Composition Q-1 | PDMS | 113.0 | 7.8 |
|  | 7 | Composition W-7 | Composition Q-1 | PDMS | 113.0 | 7.5 |
|  | 8 | Composition W-8 | Composition Q-1 | PDMS | 113.0 | 6.2 |
|  | 9 | Composition W-9 | Composition Q-1 | PDMS | 113.0 | 6.7 |
|  | 10 | Composition W-1 | Composition Q-2 | PDMS | 113.0 | 6.7 |
|  | 11 | Composition W-1 | Composition Q-3 | PDMS | 113.0 | 7.1 |
|  | 12 | Composition W-1 | Composition Q-4 | PDMS | 113.0 | 7.1 |
|  | 13 | Composition W-1 | Composition Q-5 | PDMS | 113.0 | 7.4 |
|  | 14 | Composition W-1 | Composition Q-6 | PDMS | 113.0 | 6.5 |
|  | 15 | Composition W-1 | Composition Q-7 | PDMS | 113.0 | 7.1 |
|  | 16 | Composition W-1 | Composition Q-8 | PDMS | 113.0 | 6.6 |
|  | 17 | Composition W-1 | Composition Q-9 | PDMS | 113.0 | 7.1 |
|  | 18 | Composition W-1 | Composition Q-10 | PDMS | 113.0 | 6.2 |
|  | 19 | Composition W-1 | Composition Q-11 | PDMS | 113.0 | 6.8 |
|  | 20 | Composition W-1 | Composition Q-12 | PDMS | 113.0 | 7.2 |
|  | 21 | Composition W-1 | Composition Q-13 | PDMS | 113.0 | 6.5 |
|  | 22 | Composition W-1 | Composition Q-1 | COP | 83.0 | 5.7 |
|  | 23 | Composition W-7 | Composition Q-1 | PET | 74.0 | 4.7 |
|  | 24 | Composition W-1 | Composition Q-1 | PS | 71.0 | 6.1 |
| Comparative Example | 1 | Composition W-1 | Composition Q-14 | PDMS | 113.0 | 8.1 |
|  | 2 | Composition W-1 | Composition Q-15 | PDMS | 113.0 | 9.5 |
|  | 3 | Composition W-1 | — | PDMS | 113.0 | 6.9 |
|  | 4 | Composition W-10 | — | PDMS | 113.0 | 112.0 |
|  | 5 | Composition W-11 | Composition Q-1 | PDMS | 113.0 | 111.5 |
|  | 6 | Composition W-12 | Composition Q-2 | PDMS | 113.0 | 112.0 |
|  | 7 | Composition W-1 | Composition Q-16 | PDMS | 113.0 | 8.3 |
|  | 8 | Composition W-1 | Composition Q-17 | PDMS | 113.0 | 8.3 |

From the results of Table 4, it was demonstrated that in Examples in which a hydrophilic layer was formed on an anti-static layer formed using an anti-static agent containing an electrolyte, a hydrophilic polymer (a) and water, and having electrical conductivity of 15 mS/m or more, the contact angle after treatment was as small as 10° or less, showing excellent hydrophilicity. It is shown that the anti-static layer has an effect of suppressing an increase of the contact angle of the substrate such as polydimethylsiloxane (PDMS) and cycloolefin polymer (COP), which is easily charged. On the contrary, in Comparative Example 3 in which the anti-static treatment step was not carried out, the substrate was able to be provided with hydrophilicity immediately after the hydrophilizing treatment step, but the hydrophilicity was lost one week after the treatment. With regard to the anti-static agent, in Comparative Examples 1 and 2 in which an electrolyte was not included, Comparative Example 7 in which a hydrophilic polymer (a) was not included, as well as Comparative Example 8 in which the electrical conductivity was only 1.2 mS/m, the hydrophilicity was able to be provided immediately after the treatment but the hydrophilicity was lost one week after the treatment. With regard to the hydrophilizing treatment agent, Comparative Examples 4 to 6 in which ethanol was not contained, adhesion to the anti-static layer was poor, so that a hydrophilizing treatment agent was not able to be applied, and thus, the substrate was not able to be provided with hydrophilicity. Comparative Example 4 is also an example in which anti-static treatment step is not carried out. The substrate was not able to be provided with hydrophilicity in Comparative Example 4 even immediately after the treatment, although the substrate was able to be provided with hydrophilicity in Comparative Example 3 in which the anti-static treatment step was not carried out similar to Comparative Example 4. The results suggest that it is important that the hydrophilizing treatment agent contains ethanol.

Example 25 and Comparative Examples 9 to 11

The same treatment was carried out and the contact angle was measured in the same manner as in Example 1 except that any one of drying and rinsing in the anti-static treatment step or in the hydrophilizing treatment step was not carried out as shown in Table 5 (see "x" in Table 5). In Comparative Example 9, the contact angle one week after dropping was measured. Results are shown in Table 5.

TABLE 5

| | Anti-static treatment | | Hydrophilizing treatment | | Contact angle after treatment [°] | Contact angle after one week [°] | Note |
|---|---|---|---|---|---|---|---|
| | Drying | Rinsing | Drying | Rinsing | | | |
| Comparative Example 9 | x | ○ | ○ | ○ | 7.8 | more than 70 | Anti-static layer was not formed |
| Example 25 | ○ | x | ○ | ○ | 6.5 | — | Part of anti-static layer was eluted in hydrophilizing treatment agent, but ultrathin film was adsorbed |
| Comparative Example 10 | ○ | ○ | x | ○ | 111.9 | — | Hydrophilic layer was not formed |
| Comparative Example 11 | ○ | ○ | ○ | x | — | — | Dissolved in water for measuring contact angle |

From the results of Table 5, in Comparative Example 9 in which the drying in the anti-static treatment step was not carried out, an anti-static layer was not formed. The substrate was able to be provided with hydrophilicity immediately after the hydrophilizing treatment step, but the hydrophilicity was lost one week after the treatment. In Comparative Example 10 in which the drying in the hydrophilizing treatment step was not carried out, a hydrophilic layer was not formed. Even immediately after the treatment, the substrate was not able to be provided with hydrophilicity. In Example 25 in which the rinsing in the anti-static treatment step was not carried out, an anti-static layer and a hydrophilic layer were formed. The hydrophilicity immediately after the treatment was as excellent as in Example 1 including the rinsing in both steps. In Example 25, however, when the substrate was immersed in a liquid bath of the hydrophilizing treatment agent without carrying out the rinsing after the drying in the anti-static treatment step, the lower part of the anti-static layer remained to be adsorbed on the substrate, but the upper part of the anti-static layer was eluted into the hydrophilizing treatment agent. In that respect, when a film thickness of the anti-static layer is larger, it is suggested that rinsing is preferably carried out in the anti-static treatment step. In Comparative Example 11 in which the rinsing in the hydrophilizing treatment step was not carried out, the hydrophilic polymer (a) and/or (b) was dissolved in pure water for measuring the contact angle, the contact angle was not measured in the same conditions as those for the other Examples and Comparative Examples. This suggests that although the hydrophilicity of a base material is provided immediately after the treatment, the hydrophilicity is lost in the use of the base material.

What is claimed is:

1. A surface treatment method comprising:
coating a treatment target with an anti-static agent comprising an electrolyte (e1), a hydrophilic polymer (a) and water, and having electrical conductivity of 15 mS/m or more and 2000 mS/m or less to obtain a coated film (A), and drying the coated film (A) to obtain an anti-static layer; and
coating the anti-static layer with a hydrophilizing treatment agent comprising a hydrophilic polymer (b) and an alcohol to obtain a coated film (B), and drying the coated film (B), followed by rinsing thereof, wherein the electrolyte (e1) is at least one selected from the group consisting of alkali metal chloride, alkaline-earth metal chloride, alkali metal sulfate, and alkaline-earth metal sulfate; and
the hydrophilic polymer (a) and the hydrophilic polymer (b) each independently comprise a polymer having at least a first group and a second group,
wherein the first group is derived from a monomer represented by a formula selected from the group consisting of the following formulas (A5) and (A6):

$$CH_2=CR^1-CO-NR^2R^3 \quad (A5),$$

wherein in the formula (A5), $R^1$ represents a hydrogen atom or a methyl group; $R^2$ and $R^3$ are an alkyl group having 1 to 4 carbon atoms optionally substituted with at least one group selected from the group consisting of an amino group, a sulfonic acid group, and a hydroxyl group, or a hydrogen atom, $$CH_2=CR^{S1}-R^{S2}-(SO_3^-M_{1/m})_p \quad (A6),$$

wherein in the formula (A6), $R^{S1}$ represents a hydrogen atom or a methyl group, $R^{S2}$ represents a single bond, an aminoalkylene group, an amide bond-containing group, or an aliphatic hydrocarbon group that may have a hydrophobic substituent, M represents a hydrogen atom or m-valence cation, m is an integer of 1 to 2, and p is an integer of 1 to 2, with the proviso that when M is a hydrogen atom, $M_{1/m}$, is equal to M,
and the second group is derived from a monomer represented by a formula selected from the group consisting of the formulas (A5), (A6) and the following formula (A2):

$$CH_2=CR^4-(R^5)a-CO-R^6\ldots \quad (A2),$$

wherein in the formula (A2), $R^4$ is a hydrogen atom or a methyl group, $R^5$ is a divalent hydrocarbon group, a is 0 or 1, $R^6$ is —OH or —O—$R^7$, $R^7$ is a hydrocarbon group optionally substituted with at least one functional group selected from the group consisting of a hydroxyl group, a cyano group, and a carboxyl group.

2. The surface treatment method according to claim 1, wherein the hydrophilic polymer (b) is ethanol-soluble.

3. The surface treatment method according to claim 1, wherein a content of the hydrophilic polymer (a) is 5 mass % or less with respect to a mass of the anti-static agent.

4. The surface treatment method according to claims 1, wherein the alcohol is more than 50 mass % of a solvent for the hydrophilizing treatment agent.

5. The surface treatment method according to claim 1, wherein the alcohol is an alcohol having 1 to 3 carbon atoms.

6. The surface treatment method according to claim 1, further comprising rinsing after the drying of the coated film (A).

7. The surface treatment method according to claim 6, wherein the rinsing comprises:
rinsing with a rinsing liquid comprising an electrolyte (e1) and having electrical conductivity of 15 mS/m or more, and subsequently rinsing with pure water; or
rinsing with pure water without carrying out rinsing with the rinsing liquid.

8. The surface treatment method according to claim 1, wherein the rinsing of the coated film (B) comprises:
rising with a rinsing liquid comprising an electrolyte (e2) and having electrical conductivity of 15 mS/m or more, and subsequently rinsing with pure water; or
rinsing with pure water without carrying out rinsing with the rinsing liquid.

9. The surface treatment method according to claim 1, wherein $R^6$ in the formula (A2) is —O—$R^7$, wherein $R^7$ is as defined above.

10. The surface treatment method according to claim 1, wherein a surface on the treatment target to be coated with the anti-static agent has a contact angle with respect to water of 60° or more.

11. A surface treatment method comprising:
coating a treatment target with an anti-static agent comprising an electrolyte (e1), a hydrophilic polymer (a) and water, and having electrical conductivity of 15 mS/m or more and 2000 mS/m or less to obtain a coated film (A), and drying the coated film (A) to obtain an anti-static layer; and
coating the anti-static layer with a hydrophilizing treatment agent comprising a hydrophilic polymer (b) and an alcohol to obtain a coated film (B), and drying the coated film (B), followed by rinsing thereof,
wherein the electrolyte (e1) is at least one selected from the group consisting of alkali metal chloride, alkaline-earth metal chloride, alkali metal sulfate, and alkaline-earth metal sulfate; and the hydrophilic polymer (a) and the hydrophilic polymer (b) each independently comprise a polymer having a group derived from a monomer represented by at least one formula selected from the group consisting of the following formulas (a6-1) and (a6-2):

a6-1

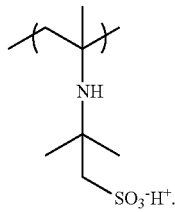

a6-2

12. The surface treatment method according to claim 11, wherein the electrolyte (e1) is at least one metal chloride selected from the group consisting of alkali metal chloride and alkaline-earth metal chloride.

13. The surface treatment method according to claim 11, wherein the hydrophilic polymer (b) is ethanol-soluble.

14. The surface treatment method according to claim 11, wherein a surface on the treatment target coated with the anti-static agent has a contact angle with respect to water of 60° or more.

15. The surface treatment method according to claim 11, wherein a content of the hydrophilic polymer (a) is 5 mass % or less with respect to a mass of the anti-static agent.

16. The surface treatment method according to claim 11, wherein the alcohol is more than 50 mass % of a solvent for the hydrophilizing treatment agent.

17. The surface treatment method according to claim 11, wherein the alcohol is an alcohol having 1 to 3 carbon atoms.

18. The surface treatment method according to claim 11, further comprising rinsing after the drying of the coated film (A).

19. The surface treatment method according to claim 18, wherein the rinsing comprises:
rinsing with a rinsing liquid comprising the electrolyte (e1) and having electrical conductivity of 15 mS/m or more, and subsequently rinsing with pure water; or
rinsing with pure water without carrying out rinsing with the rinsing liquid.

* * * * *